(12) United States Patent
Carnahan et al.

(10) Patent No.: US 6,852,811 B1
(45) Date of Patent: Feb. 8, 2005

(54) PROCESS FOR PREPARING A SUPPORTED POLYMERIZATION CATALYST USING REDUCED AMOUNTS OF SOLVENT AND POLYMERIZATION PROCESS

(75) Inventors: Edmund M. Carnahan, Fresno, TX (US); Ian M. Munro, Lake Jackson, TX (US); Marc A. Springs, Angleton, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/869,578

(22) PCT Filed: Dec. 6, 1999

(86) PCT No.: PCT/US99/28850

§ 371 (c)(1),
(2), (4) Date: Oct. 23, 2001

(87) PCT Pub. No.: WO00/40623

PCT Pub. Date: Jul. 13, 2000

Related U.S. Application Data

(60) Provisional application No. 60/114,372, filed on Dec. 30, 1998.

(51) Int. Cl.[7] .................................................. C08F 4/52
(52) U.S. Cl. ....................... 526/126; 526/127; 526/129; 526/130; 526/160; 526/170; 526/943; 526/161; 526/172; 526/134
(58) Field of Search ................................. 526/160, 161, 526/172, 126, 130, 134, 147; 502/103, 117, 123, 724, 728

(56) References Cited

U.S. PATENT DOCUMENTS

| | | | | |
|---|---|---|---|---|
| 4,808,561 A | * | 2/1989 | Welborn et al. | 502/104 |
| 4,843,133 A | * | 6/1989 | Short et al. | 526/129 |
| 4,950,631 A | * | 8/1990 | Buehler et al. | 502/119 |
| 5,098,969 A | * | 3/1992 | Buehler et al. | 526/119 |
| 5,227,440 A | * | 7/1993 | Canich et al. | 526/129 |
| 5,654,248 A | * | 8/1997 | Kioka et al. | 502/108 |
| 5,700,749 A | * | 12/1997 | Tsutsui et al. | 502/117 |
| 5,783,512 A | * | 7/1998 | Jacobsen et al. | 502/124 |
| 5,883,204 A | * | 3/1999 | Spencer et al. | 526/134 |
| 5,965,677 A | * | 10/1999 | Stephan et al. | 526/129 |
| 6,025,448 A | * | 2/2000 | Swindoll et al. | 526/127 |
| 6,063,726 A | * | 5/2000 | Kioka et al. | 502/117 |
| 6,087,293 A | * | 7/2000 | Carnahan et al. | 502/158 |
| 6,197,899 B1 | * | 3/2001 | Mitchell et al. | 526/64 |
| 6,207,775 B1 | * | 3/2001 | Marti et al. | 526/160 |
| 6,239,058 B1 | * | 5/2001 | Shamshoum et al. | 502/110 |
| 6,271,165 B1 | * | 8/2001 | Jacobsen et al. | 502/104 |
| 6,479,599 B1 | * | 11/2002 | Peil et al. | 526/127 |

FOREIGN PATENT DOCUMENTS

| | | | |
|---|---|---|---|
| WO | WO 9743323 | 11/1997 | |
| WO | WO 9845337 | 10/1998 | |
| WO | WO 98/45337 A1 | * 10/1998 | ........... C08F/10/00 |

* cited by examiner

Primary Examiner—David W. Wu
Assistant Examiner—Rip A. Lee
(74) Attorney, Agent, or Firm—Finnegan, Henderson, Farabow, Garrett & Dunner, L.L.P.

(57) ABSTRACT

The subject invention provides a process for preparing an olefin polymerization catalyst wherein a calcined and passivated silica support (support precursor) is sequentially contacted with a first solution of a metal complex or of a cocatalyst, and thereafter with a second solution of the other of the metal complex or the cocatalyst, wherein the second solution is provided in an amount such that 100 percent of the pore volume of the support precursor is not exceeded. Optionally, the compatible solvent of the first and/or second solutions is removed. The subject invention further provides a process for polymerizing one or more α-olefins in the presence of the olefin polymerization catalyst prepared by the process of the invention.

19 Claims, No Drawings

PROCESS FOR PREPARING A SUPPORTED POLYMERIZATION CATALYST USING REDUCED AMOUNTS OF SOLVENT AND POLYMERIZATION PROCESS

Claims the benefit of U.S. Provisional application No. 60/114,372, filed Dec. 30, 1998.

The subject invention is directed to a process for supporting a single site metallocene or constrained geometry catalyst and cocatalyst; to the supported catalyst systems resulting therefrom; and to a process for polymerizing at least one α-olefin utilizing the supported catalyst system of the invention.

Olefin polymerization catalysts used in the fluidized gas phase process are typically supported on a carrier to impart the necessary particle morphology to the polymer powder. A preferred method of supporting high activity single site constrained geometry or metallocene catalysts and producing a powder involves preparing a solvent mixture of the support and the catalyst/cocatalyst components and removing the solvent under heat and vacuum. However, such a method poses preparation/stability concerns, as well as polymer product morphology concerns.

In terms of the preparation/stability concerns, once the catalyst and cocatalyst components are mixed at an elevated activating temperature, they are not typically stable for an indefinite period of time, either as a solution or as deposited on treated silica. Subsequent work up of the catalyst often requires one or more solvent washes, solvent decants, and/or filtrations, followed by the removal the solvent, typically by application of heat and vacuum. However, exposure to elevated temperatures, long drying times, and/or incomplete removal of solvent can often have a deleterious effect on, catalyst activity, either during preparation or upon storage. Further, the volume of solvent required to make a flowable slurry is typically at least 4 L/Kg of catalyst powder. A catalyst formulation technique that minimizes the amount of solvent required for preparation would be advantageous.

In terms of the product morphology concerns, when a single site catalyst is activated by a suitable cocatalyst prior to introduction into the reactor, the catalyst is at peak activity when injected into the reactor. This can result in sudden and intense activity, severe fracturing of the catalyst particles leading to high fines, and/or high exotherms leading to agglomerates. In addition, fouling of the catalyst injection system can occur.

It is noted that traditional Ziegler-Natta catalysts do not achieve peak activity until after the catalyst has been injected into the reactor. This may be in part attributed to the fact that, in the case of typical Ziegler-Natta polymerization processes, addition of $Et_3Al$ to the reactor can result in metal activation. See, for instance, Boor, John Jr., *Ziegler-Natta Catalysts and Polymerizations,* 1979, Academic Press. NY, Chapter 18: Kinetics.

To control the polymerization of at least one α-olefin by a single site constrained geometry or metallocene catalyst in a gas phase polymerization process, an in-reactor activation of metal sites on the carrier would be advantageous. However, this is not without difficulty. Typical single site constrained geometry and metallocene catalyst components, and activators for such catalyst components, such as methyl alumoxane and fluorinated aryl boranes and borates have low vapor pressures, making dual injection difficult.

U.S. Pat. No. 5,332,706 discloses a process for preparing a supported catalyst, comprising applying an alumoxane solution to a porous support, such that alumoxane solution is provided to the support in an amount insufficient to form a slurry thereof. The application contemplates adding a metallocene to the alumoxane solution prior to contacting with the support.

U.S. Pat. No. 5,625,015 discloses a process for preparing a supported catalyst, comprising spraying a solution of the catalyst and cocatalyst onto a support, wherein the solution is provided in such an amount that the pore volume of the support is exceeded.

U.S. Pat. No. 5,721,184 discloses a process for preparing a supported catalyst, comprising spraying a solution of the catalyst & cocatalyst onto a support disposed in a conical dryer. The application contemplates embodiments wherein the volume of catalyst solution is less than the pore volume of the support.

PCT Application WO 97/02297 discloses a method for forming a prepolymerized supported metallocene catalyst system, comprising prepolymerizing a gaseous olefin monomer in the presence of a supported metallocene catalyst system wherein the pores of the catalyst system contain a volume of liquid equal to or less than the total pore volume of the supported catalyst system.

PCT Application WO 97/29134 discloses a process for making a supported metallocene/alumoxane catalyst system. One embodiment contemplates adding solutions of metallocene and alumoxane separately to the support, where the solution has a total volume in the range of from two to three times the total pore volume of the support.

U.S. Pat. No. 5,422,325 discloses a process for making a supported catalyst system comprising slurrying a support in a solvent, and sequentially adding to the slurry a solution of a metallocene catalyst and a solution of an alumoxane cocatalyst. The disclosed process employs a drying step after the addition of both solutions is complete.

Industry would find great advantage in a supported catalyst formulation that is robust, has a delayed activity indicating extended shelf life, and is useful to polymerize α-olefins to form polymer particles having low fines (<125 μm), low agglomerates (>1500 μm), and an acceptable bulk density (>0.3 g/mL).

Accordingly, the present invention is directed to a process for formulating a supported olefin polymerization catalyst that does not require exposure to excessive heat during any solvent removal steps, and which exhibits robust activity despite a delay between the preparation of the supported catalyst system and its introduction into a polymerization reactor.

The subject invention further provides a process for preparing supported catalyst systems that exhibit a decreased rate of catalyst activation at room temperature.

In particular, the subject invention provides a process for preparing an olefin polymerization catalyst comprising:

A. calcining silica at a temperature of 30 to 1000° C. to form calcined silica,

B. reacting the calcined silica with an agent selected from the group consisting of:
  i. Lewis acid alkylating agents,
  ii. silane or chlorosilane functionalizing agents, and
  iii. aluminum components selected from an alum xane or an aluminum compound of the formula $AlR^1_{x'}R^2_{y'}$, wherein $R^1$ independently each occurrence is hydride or R, $R^2$ is hydride, R or OR, x' is 2 or 3, y'is 0 or 1 and the sum of x' and y' is 3,
  to form a support precursor having a specified pore volume, C. applying to the support precursor a first solution in a compatible solvent of one of the following:
  (1) a complex of a metal of Groups 3–10 of the Periodic Table of the Elements or (2) a cocatalyst selected from the group consisting of non-polymeric, non-oligomeric complexes capable of activating the complex of (C)(i) for the polymerization of α-olefins
and optionally removing the compatible solvent to form a supported procatalyst;

D. applying to the supported procatalyst a second solution in a compatible solvent of the other of the catalyst or cocatalyst of (C) to form a supported catalyst, wherein the second solution is provided in an amount such that 100 percent of the pore volume of the support precursor is not exceeded; and E. optionally removing the compatible solvent from the supported catalyst to form a recovered supported catalyst system.

The subject invention further provides a process for polymerizing at least one α-olefin monomer comprising:

A. preparing a supported cocatalyst by:
  i. calcining silica at a temperature of 30 to 1000° C. to form calcined silica,
  ii. reacting the calcined silica with an agent selected from the group consisting of:
    (a) Lewis acid alkylating agents,
    (b) silane or chlorosilane functionalizing agents, and
    (c) aluminum components selected from an alumoxane or an aluminum compound of the formula $AlR^1_{x'}R^2_{y'}$, wherein $R^1$ independently each occurrence is hydride or R, $R^2$ is hydride, R or OR, x' is 2 or 3, y' is 0 or 1 and the sum of x' and y' is 3, to form a support precursor having a specified pore volume,
  iii. applying to the support precursor a first solution in a compatible solvent of one of the following:
    (a) a complex of a metal of Groups 3–10 of the Periodic Table of the Elements or
    (b) a cocatalyst selected from the group consisting of non-polymeric, non-oligomeric complexes capable of activating the complex of (C)(i) for the polymerization of α-olefins
    and optionally removing the compatible solvent to form a supported procatalyst;
  iv. applying to the recovered supported procatalyst a second solution in a compatible solvent of the other of the catalyst or cocatalyst of (C) to form a supported catalyst, wherein the second solution is provided in an amount such that 100 percent of the pore volume of the support precursor is not exceeded; and
  v. optionally removing the compatible solvent from the supported catalyst to form a recovered supported catalyst system;

B. pressurizing a gas phase polymerization reactor with the at least one α-olefin monomer to be polymerized;

C. introducing the recovered supported catalyst system to the gas phase polymerization reactor;

D. activating the recovered supported catalyst system; and

E. recovering the polymerized product from the reactor.

These and other embodiments are more fully described in the following detailed description.

The supported catalyst systems of the invention will comprise a metal complex, a cocatalyst, and a support.

Concerning the Metal Complex

Suitable metal complexes for use in the practice of the claimed invention include any complex of a metal of Groups 3–10 of the Periodic Table of the Elements capable of being activated to polymerize addition polymerizable compounds, especially olefins.

Suitable metal complexes may be derivatives of any transition metal Including Lanthanides, but preferably of Group 3, 4; or Lanthanide metals which are in the +2, +3, or +4 formal oxidation state meeting the previously mentioned requirements. Preferred compounds include metal complexes (metallocenes) containing from 1 to 3 π-bonded anionic ligand groups, which may be cyclic or noncyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of delocalized electrons present in a π bond.

Each atom in the delocalized π-bonded group may independently be substituted with a radical selected from the group consisting of halogen, hydrocarbyl, halohydrocarbyl, and hydrocarbyl-substituted Group 14 or 15 radicals. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system or a hydrogenated fused ring system. Suitable hydrocarbyl-substituted Group 14 or 15 radicals include mono-, di- and trihydrocarbyl-substituted radicals of Group 14 or 15 elements wherein each of the hydrocarbyl groups contains from 1 to 20 carbon atoms or two such groups together form a divalent derivative thereof. Examples of suitable hydrocarbyl-substituted Group 14 or 15 radicals include trimethylsilyl, triethylsilyl, ethyldimethylsilyl, methyldiethylsilyl, triphenylgermyl, trimethylgermyl, dimethylamino, dimethylphosphino, and 1-pyrrolidinyl groups.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted derivatives thereof. Preferred anionic delocalized π-bonded groups are cyclopentadienyl, pentamethylcyclopentadienyl, tetramethylcyclopentadienyl, indenyl, 2,3-dimethylindenyl, fluorenyl, 2-methylindenyl and 2-methyl-4-phenylindenyl.

More preferred are metal complexes corresponding to the formula:

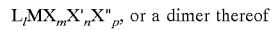 , or a dimer thereof wherein:

L is an anionic, delocalized, π-bonded group that is bound to M, containing up to 50 nonhydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +2, +3 or +4 formal oxidation state;

X is an optional, divalent substituent of up to 50 nonhydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M.

Such preferred complexes include those containing either one or two L groups. The latter complexes include those containing a bridging group linking the two L groups. Preferred bridging groups are those corresponding to the formula $(ER^*_2)_x$ wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Examples of the foregoing bis(L) containing complexes are compounds corresponding to the formula:

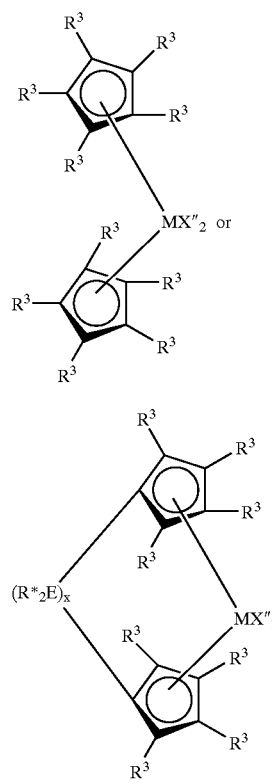

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 non-hydrogen atoms forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possess $C_2$ symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-1-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1, 1, 2, 2-tetramethyl-1,2-disilyl-bis-cyclopentadienyl), (1,2-bis(cyclopentadienyl) ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention correspond to the formula:

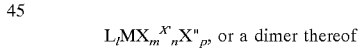

wherein:

L is an anionic, delocalized, π-bonded group that is bound to M, containing up to 50 nonhydrogen atoms;

M is a metal of Group 4 of the Periodic Table of the Elements in the +2, +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M or a neutral $C_{5-30}$ conjugated diene, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

Preferred divalent X substituents preferably include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention correspond to the formula:

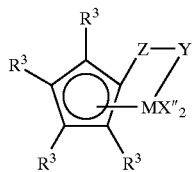

wherein:

M is titanium or zirconium in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a halo, hydrocarbyl, hydrocarbyloxy or silyl group, said group having up to 20 nonhydrogen atoms, or two X" groups together form a $C_{5-30}$ conjugated diene;

Y is —O—, —S—, —NR*—, —PR*—; and

Z is $SiR^*_2$, $CR^*_2$, $SiR_{12}SiR_{12}$, $CR^*_2CR^*_2$, $CR^*=CR^*$, $CR^*_{12}SiR_2$, or $GeR^*_2$, wherein: R* is as previously defined.

A further class of metal complexes useful in preparing the catalysts of the invention include Group 10 diimine derivatives corresponding to the formula:

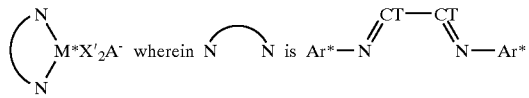

CT—CT is 1,2-ethanediyl, 2,3-butanediyl, or form a fused ring system wherein the two T groups together are a 1,8-naphthanediyl group; and A' is the anionic component of the foregoing charge separated activators.

Similar complexes to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as vinyl chloride, alkyl acrylates and alkyl methacrylates.

Additional complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyloxy, hydrocarbylsulfide, dihydrocarbylamino, and hydrocarbyl-substituted metalloid radicals wherein the metalloid is selected from Group 14 of the Periodic Table of the Elements, and such hydrocarbyl-, halohydrocaryl-, hydrocarbyloxy-, hydrocartylsulfide-, dihydrocarbylamino- or hydrocarbyl-substituted metalloid radicals that are further substituted with a Group 15 or 16 hetero ator containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethyl-silyl, triphenylgermyl, and trimethylgermyl groups. Examples of Group 15 or 16 hetero atom containing moieties include amine, phosphine, ether or thioether moieties or divalent derivatives thereof, for example, amide, phosphide, ether or thioether groups bonded to the transition metal or Lanthanide metal, and bonded to the hydrocarbyl group or to the hydrocarbyl-substituted metalloid containing group.

Examples of suitable anionic, delocalized 7-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted, $C_{1-10}$ hydrocarbyloxy-substituted, di($C_{1-10}$ hydrocarbyl)amino-substituted, or tri ($C_{1-10}$ hydrocarbyl) silyl-substituted derivatives thereof. Preferred anionic delocalized n-bonded groups are cyclopentadienyl, pentamethylcyclopentadienyl, tetramethylcyclopentadienyl, tetramethylsilylcyclo-pentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing analogues to benzene. They are previously known in the art having been described by G. Herberich, et al., in *Organometallics*, 1995, 14, 1, 471–480. Preferred boratabenzenes correspond to the formula:

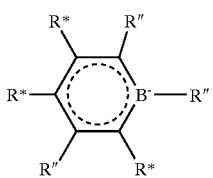

wherein R" is selected from the group consisting of hydrocarbyl, silyl, or germyl, said R" having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

Illustrative Group 4 metal complexes that may be employed in the practice of the present invention include:
cyclopentadienyltitaniumtrimethyl,
cyclopentadienyltitaniumtriethyl,
cyclopentadienyltitaniumtrisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopenladienyltitaniumtrimethyl,
indenyltitaniumtrlmethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-$\eta^5$-1,4,5,6,7,8-hexahydronaphthalenyl)titaniumtrimethyl, (1,1,2,3-tetramethyl-2,3,4,9,10-$\eta^5$-1,4,5,6,7,8-hexahydronaphthalenyl)titaniumtrimethyl,
(tert-butylamido)(tetramethyl-$\eta^5$-cyclopentadienyl) dimethylsilanetitanium dichloride,
(tert-butylamido)(tetramethyl-$\eta^5$-cyclopentadienyl) dimethylsilanetitanium dimethyl,
(tert-butylamido)(tetramethyl-$\eta^5$-cyclopentadienyl)-1,2-ethanediyltitanium dimethyl,
(tert-butylamido)(hexamethyl-$\eta^5$-indenyl) dimethylsilanetitanium dimethyl,
(tert-butylamido)(tetramethyl-$\eta^5$-cycopentadienyl) dimethylsilane titanium (III) 2-(dimethylamino)benzyl;
(tert-butylamido)(tetramethyl-$\eta^5$-cyclopentadienyl) dimethylsilanetitanium (III) allyl,
(tert-butylamido)(tetramethyl-$\eta^5$-cyclopentadienyl) dimethylsilanetitanium (II) 1,4-diphenyl-1,3-butadiene,
(tert-butylamido)(2-methylindenyl)dimethylsilanetitanium (II) 4-diphenyl-1,3-butadiene,
(tert-butylamido)(2-methylindenyl)dimethylsilanetitanium (IV) 1,3-butadiene,
(tert-butylamido)(2,3-dimethylindenyl) dimethylsilanetitanium (II) 1,4-diphenyl-1,3-butadiene,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl) dimethylsilanetitanium (II) 1,4-diphenyl-1,3-butadiene,
(tert-butylamido)(tetramethyl-$\eta^5$-cyclopentadienyl) dimethylsilanetitanium (IV) 1,3-butadiene,
(tert-butylamido)(tetramethyl-$\eta^5$-cyclopentadienyl) dimethylsilanetitanium (II)1,4-dibenzyl-1,3-butadiene,
(tert-butylamido)(tetramethyl-$\eta^5$-cyclopentadienyl) dimethylsilanetitanium (II) 2,4-hexadiene,
(tert-butylamido)(tetramethyl-(5-cyclopentadienyl) dimethylsilanetitanium (II) 3-methyl 1,3-pentadiene,
(tert-butylamido)(2,4-dimethyl-1,3-pentadien-2-yl) dimethylsilanetitaniumdimethyl,
(tert-butylamido)(1,1-dimethyl-2,3,4,9,10-$\eta^5$-1,4,5,6,7,8-hexahydronaphthalen-4-yl) dimethylsilanetitaniumdimethyl,
(tert-butylamido)(1,1,2,3-tetramethyl-2,3,4,9,10-$\eta^5$-1,4,5,6,7,8-hexahydronaphthalen-4-yl) dimethylsilanetitaniumdimethyl,
(tert-butylamido)(tetramethylcyclopentadienyl) dimethylsilanetitanium 1,3-pentadiene,
(tert-butylamido)(3-(N-pyrrolidinyl)inden-1-yl) dimethylsilanetitanium 1,3-pentadiene,
(tert-butylamido)(2-methyl-s-indacen-1-yl) dimethylsilanetitanium 1,3-pentadiene, and
(tert-butylamido)(3,4-cyclopenta(/)phenanthren-2-yl) dimethylsilanetitanium 1,4-diphenyl-1,3-butadiene.

Bis(L) containing complexes including bridged complexes suitable for use in the present invention include:
biscyclopentadienylzirconiumdimethyl,
biscyclopentadienyltitaniumdiethyl,
biscyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitanlummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitanium methyltrimethylsilyl,
bistetrahydroindenyltitanium methyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2,4-pentadienyl,
(dimethylsilyl-bis-t-butylcyclopentadienyl) zirconiumdichloride,
(methylene-bis-pentamethylcyclopentadienyl)titanium(III) 2-(dimethylamino)benzyl,
(dimethylsilyl-bis-indenyl)zirconiumdichloride,
(dimethylsilyl-bis-2-methylindenyl)zirconiumdimethyl,
(dimethylsilyl-bis-2-methyl-4-phenylindenyl) zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene, (dimethylsilyl-bis-fluorenyl)zirconiumdichloride,
(dimethylsilyl-bis-tetrahydrofluorenyl)zirconiumdi(trimethylsilyl),
(isopropylidene)(cyclopentadienyl)(fluorenyl)zirconiumdibenzyl, and
(dimethylsilylpentamethylcyclopentadienylfluorenyl)zirconiumdimethyl.

Concerning the Cocatalyst

The metal complexes are rendered catalytically active by combination with an activating cocatalyst or by use of an activating technique. Suitable activating cocatalysts for use herein include neutral Lewis acids, such as C$_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 20 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium-, sulfonium-, or ferrocenium-salts of compatible, noncoordinating anions; bulk electrolysis (explained in more detail hereinafter); and combinations of the foregoing activating cocatalysts and techniques. The foregoing activating cocatalysts and activating techniques have been previously taught with respect to different metal complexes in the following references: U.S. Pat. Nos. 5,132,380, 5,153,157, 5,064,802, 5,321,106, 5,721,185,5,350,723, and 5,919,983.

Combinations of Lewis acids, especially the combination of a trialkyl aluminum compound having from 1 to 4 carbons in each alkyl group and a halogenated tri(hydrocarbyl)boron compound-having from 1 to 20 carbons in each hydrocarbyl group, especially tris(pentafluorophenyl)borane, further combinations of such neutral Lewis acid mixtures with a polymeric or ollgomeric alumoxane, and combinations of a single neutral Lewis acid, especially tris(pentafluorophenyl)borane with a polymeric or oligomeric alumoxane are desirable activating catalysts.

Suitable ion forming compounds useful as cocatalysts in one embodiment of the present invention comprise a cation which is a Bronsted acid capable of donating a proton, and a compatible, noncoordinating anion, A⁻. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a Lewis bases such as olefin monomer. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are Noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

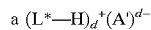
$$a\ (L^*\text{—}H)_d^+(A')^{d-}$$

wherein:
L* is a neutral Lewis base;
(L*—H)⁺ is a Bronsted acid;
A'$^{d-}$ is a noncoordinating, compatible anion having a charge of d−, and
d is an integer from 1 to 3.

More preferably A'$^{d-}$ corresponds to the formula: [M*Q₄]⁻;

wherein:
M* is boron or aluminum in the +3 formal oxidation state; and
Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal substituted-hydrocarbyl, organometalloid substituted-hydrocarbyl halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-p rhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is A″. Activating cocatalysts comprising boron which are particularly useful in the preparation of catalysts of this invention may be represented by the following general formula:

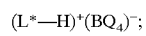
$$(L^*\text{—}H)^+(BQ_4)^-;$$

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate, N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl) borate,
methyldioctadecylammonium tetrakis(pentafluorophenyl) borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-(2,4,6-trimethylanilinium) tetrakis-(2,3,4,6-tetrafluorophenyl)borate.

Dialkyl ammonium salts such as:
dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Especially preferred are tetrakis(pentafluorophenyl) borate salts of long chain alkyl mono- and disubstituted ammonium complexes, especially $C_{14}$–$C_{20}$ alkyl ammonium complexes, especially methyldi(octadecyl)ammonium tetrakis(pentafluorophenyl)borate and methyldi(tetradecyl)-ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

Another suitable ammonium salt; especially for use in heterogeneous catalyst systems is formed upon reaction of a organometal compound, especially a tri($C_{1-6}$alkyl) aluminum compound with an ammonium salt of a hydroxyaryltris(fluoroaryl)borate compound. The resulting compound is an organometaloxyaryltris(fluoroaryl)borate compound which is generally insoluble in aliphatic liquids. Typically, such compounds are advantageously precipitated on support materials, such as silica, alumina or trialkylaluminum passivated silica, to form a supported cocatalyst mixture. Examples of suitable compounds include the reaction product of a tri($C_{1-6}$ alkyl)aluminum compound with the ammonium salt of hydroxyaryltris(aryl)borate. Suitable hydroxyaryltris(aryl)-borates include the ammonium salts, especially the forgoing long chain alkyl ammonium salts of:
(4-dimethylaluminumoxy-1-phenyl)tris(pentafluorophenyl) borate,
(4-dimethylaluminumoxy-3,5-di(trimethylsilyl)-1-phenyl) tris(pentafluorophenyl)borate,
(4-dimethylaluminumoxy-3,5-di(t-butyl)-1-phenyl)tris (pentafluorophenyl)borate,
(4-dimethylaluminumoxy-1-benzyl)tris(pentafluorophenyl) borate,
(4-dimethylaluminumoxy-3-methyl-1-phenyl)tris (pentafluorophenyl)borate,
(4-dimethylaluminumoxy-tetrafluoro-1-phenyl)tris (pentafluorophenyl)borate,
(5-dimethylaluminumoxy-2-naphthyl)tris (pentafluorophenyl)borate,
4-(4-dimethylaluminumoxy-1-phenyl)phenyltris (pentafluorophenyl)borate,
4-(2-(4-(dimethylaluminumoxyphenyl)propane-2-yl) phenyloxy)tris(pentafluorophenyl)borate,
(4-diethylaluminumoxy-1-phenyl)tris(pentafluorophenyl) borate,
(4-diethylaluminumoxy-3,5-di(trimethylsilyl)-1-phenyl)tris (pentafluorophenyl)borate,
(4-diethylaluminumoxy-3,5-di(t-butyl)-1-phenyl)tris (pentafluorophenyl)borate,
(4-diethylaluminumoxy-1-benzyl)tris(pentafluorophenyl) borate,
(4-diethylaluminumoxy-3-methyl-1-phenyl)tris (pentafluorophenyl)borate,
(4-diethylaluminumoxy-tetrafluoro-1-phenyl)tris (pentafluorophenyl)borate,
(5-diethylaluminumoxy-2-naphthyl)tris(pentafluorophenyl) borate,
4-(4-diethylaluminumoxy-1-phenyl)phenyltris (pentafluorophenyl)borate,
4-(2-(4-(diethylaluminumoxyphenyl)propane-2-yl) phenyloxy)tris(pentafluorophenyl)borate,
(4-diisopropylaluminumoxy-1-phenyl)tris (pentafluorophenyl)borate,
(4-diisopropylaluminumoxy-3,5-di(trimethylsilyl)-1-phenyl)tris(pentafluorophenyl)borate,
(4-diisopropylaluminumoxy-3,5-di(t-butyl)-1-phenyl)tris (pentafluorophenyl)borate,
(4-diisopropylaluminumoxy-1-benzyl)tris (pentafluorophenyl)borate,
(4-diisopropylaluminumoxy-3-methyl-1-phenyl)tris (pentafluorophenyl)borate,
(4-diisopropylaluminumoxy-tetrafluoro-1-phenyl)tris (pentafluorophenyl)borate,
(5-diisopropylaluminumoxy-2-naphthyl)tris (pentafluorophenyl)borate,
4-(4-diisopropylaluminumoxy-1-phenyl)phenyltris (pentafluorophenyl)borate, and
4-(2-(4(diisopropylaluminumoxyphenyl)propane-2-yl) phenyloxy)tris(pentafluorophenyl)borate.

An especially preferred ammonium compound is methylditetra-decylammonium (4-diethylaluminumoxy-1-phenyl)tris(penta-fluorophenyl)borate, methyldihexadecylammonium (4-diethylaluminumoxy-1-phenyl)tris(pentafluorophenyl)borate, methyldioctadecyl-ammonium (4-diethylaluminumoxy-1-phenyl)tris(pentafluorophenyl) borate, and mixtures thereof. The foregoing complexes are disclosed in U.S. Pat. Nos. 5,834,393 and 5,783,512.

Another suitable ion forming, activating cocatalyst comprises a salt of a cationic oxidizing agent and a noncoordinating, compatible anion represented by (13 the formula:

$(Ox^{e+})_d(A'^{d-})_e$, wherein $Ox^{e+}$ is a cationic oxidizing agent having a charge of e+;

e is an integer from 1 to 3; and $A'^{d-}$ and d are as previously defined.

Examples of cationic oxidizing agents include: ferrocenium, hydrocarbyl-substituted ferrocenium, $Ag^+$ or $Pb^+$. Preferred embodiments of $A'^{d-}$ are those anions previously defined with respect to the Bronsted acid containing activating cocatalysts, especially tetrakis (pentafluorophenyl)borate.

Another suitable ion forming, activating cocatalyst comprises a compound which is a salt of a carbenium ion and a noncoordinating, compatible anion represented by the formula:

$$©^+A'^-$$

wherein:

$©^+$ is a $C_{1-20}$ carbenium ion; and $A'^-$ is a noncoordinating, compatible anion having a charge of −1. A preferred carbenium ion is the trityl cation, that is, triphenylmethylium.

A further suitable ion forming, activating cocatalyst comprises a compound which is a salt of a silyllum ion and a noncoordinating, compatible anion represented by the formula:

$$R_3Si(X')A'^-$$

wherein:

R is $C_{1-10}$ hydrocarbyl;

X is hydrogen or R; and $A''^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

The molar ratio of catalyst/cocatalyst employed preferably ranges from 1:10,000 to 10:1, more preferably from 1:5000 to 10:1, most preferably from 1:1000 to 1:1. Tris (pentafluorophenyl)borane, where used as an activating cocatalyst is preferably employed in a molar ratio to the metal complex of from 0.5:1 to 10:1, more preferably from 1:1 to 6:1 most preferably from 1:1 to 5:1. The remaining activating cocatalysts are generally preferably employed in approximately equimolar quantity with the metal complex. Preferably, the catalyst and activating cocatalyst are present on the support in an amount of from 5 to 200, more preferably from 10 to 75 micromoles per gram of support.

The catalysts may be used to polymerize ethylenically and/or acetylenically unsaturated monomers having from 2 to 100,000 carbon atoms either alone or in combination. Preferred monomers include the $C_{2-20}$ α-olefins especially ethylene, propylene, isobutylene, 1-butene, 1-pentene, 1-hexene, 3-methyl-1-pentene, 4-methyl-1-pentene, 1-octene, 1-decene, long chain macromolecular α-olefins, and mixtures thereof. Other preferred monomers include styrene, $C_{1-4}$ alkyl substituted styrene, tetrafluoroethylene, vinylbenzocyclobutane, ethylidenenorbornene, 1,4-hexadiene, 1,7-octadiene, vinylcyclohexane, 4-vinylcyclohexene, divinylbenzene, and mixtures thereof with ethylene. Long chain macromolecular aα-olefins are vinyl terminated polymeric remnants formed in situ during continuous solution polymerization reactions. Under suitable processing conditions such long chain macromolecular units are readily polymerized into the polymer product along with ethylene and other short chain olefin monomers to give small quantities of long chain branching in the resulting polymer. Most preferably the present metal complexes are used in the polymerization of propylene to prepare polypropylene having a high degree of isotacticity.

In general, the polymerization may be accomplished at conditions well known in the prior art for Ziegler-Natta or Kaminsky-Sinn type polymerization reactions, such as temperatures from 0 to 250° C. and pressures from atmospheric to 1000 atmospheres (0.1 to 100 MPa). Suspension, solution, slurry, gas phase or other process conditions may be employed if desired. The support, if present, is preferably employed in an amount to provide a weight ratio of catalyst (based on metal):support from 1:100,000 to 1:10, more preferably from 1:50,000 to 1:20, and most preferably from 1:10,000 to 1:30. Suitable gas phase reactions may utilize condensation of the monomer or monomers employed in the reaction, or of an inert diluent to remove heat from the reactor.

In most polymerization reactions the molar ratio of catalyst:polymerizable compounds employed is from $10^{-12}$:1 to $10^{-1}$:1, more preferably from $10^{-12}$:1 to $10^{-5}$:1.

Suitable solvents or diluents for polymerization via a solution or slurry process are noncoordinating, inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and aromatic and alkyl-substituted aromatic compounds such as benzene, toluene, and xylene. Suitable solvents also include liquid olefins which may act as monomers or comonomers including ethylene, propylene, 1-butene, butadiene, cyclopentene, 1-hexene, 3-methyl-1-pentene, 4-methyl-1-pentene, 1,4-hexadiene, 1,7-octadiene, 1-octene, 1-decene, styrene, divinylbenzene, ethylidenenorbornene, allylbenzene, vinyltoluene (including all isomers alone or in admixture), 4-vinylcyclohexene, and vinylcyclohexane. Mixtures of the foregoing are also suitable.

The catalysts may also be utilized in combination with at least one additional homogeneous or heterogeneous polymerization catalyst in the same or in separate reactors connected in series or in parallel to prepare polymer blends having desirable properties. An example of such a process is disclosed in WO 94/00500, as well as U.S. Pat. No. 5,869,575.

Concerning the Support

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W. R. Grace & Co.) under the designations SD 3216.30, Davison Syloid 245, Davison 948 and Davison 952, and from. Crossfield under the designation ES70, and from Degussa AG under the designation Aerosil 812; and aluminas available from Akzo Chemicals Inc. under the designation Ketzen Grade B.

Supports suitable for the present invention preferably have a surface area as determined by nitrogen porosimetry using the B.E.T. method from 10 to 1000 m$^2$/g, and preferably from 100 to 600 m$^2$/g. The pore volume of the support, as determined by nitrogen adsorption, advantageously is from 0.1 to 3 cm$^3$/g, preferably from $_{0.2}$ to 2 cm$^3$/g. The average particle size depends upon the process employed, but typically is from 0.5 to 500 μm, preferably from 1 to 100 μm.

Both silica and alumina are known to inherently possess small quantities of hydroxyl functionality. When used as a support herein, these materials are preferably subjected to a heat treatment and/or chemical treatment to reduce the hydroxyl content thereof. Typical heat treatments are carried out at a temperature from 30° C. to 1000° C. (preferably 250° C. to 800° C. for 5 hours or greater) for a duration of 0 minutes to 50 hours in an inert atmosphere or air or under reduced pressure, that is, at a pressure of less than 200 Torr. When calcination occurs under reduced pressure, preferred temperatures are from 100 to 800° C. Residual hydroxy groups are then removed via chemical treatment. Typical chemical treatments include contacting with Lewis acid alkylating agents such as trihydrocarbyl aluminum compounds, trihydrocarbylchlorosilane compounds, trihydrocarbylalkoxysilane compounds or similar agents.

The support may be functionalized with a silane or chlorosilane functionalizing agent to attach thereto pendant silane —(Si—R)=, or chlorosilane —(Si—Cl)=functionality, wherein R is a $C_{1-10}$ hydrocarbyl group. Suitable functionalizing agents are compounds that react with surface hydroxyl groups of the support or react with the silicon or aluminum of the matrix; Examples of suitable functionalizing agents include phenylsilane, hexamethyldisilazane diphenylsilane, methylphenylsilane, dimethylsilane, diethylsilane, dichlorosilane, and dichlorodimethylsilane. Techniques for forming such functionalized silica or alumina compounds were previously disclosed in U.S. Pat. Nos. 3,687,920 and 3,879,368.

In the alternative, the functionalizing agent may be an aluminum component selected from an alumoxane or an aluminum compound of the formula $AlR^1_{x'}R^2_{y'}$, wherein $R^1$ independently each occurrence is hydride or R, $R^2$ is hydride, R or OR, x' is 2 or 3, y' is 0 or 1 and the sum of x' and y' is 3. Examples of suitable $R^1$ and $R^2$ groups include methyl, methoxy, ethyl, ethoxy, propyl (all isomers), propoxy (all isomers), butyl (all isomers), butoxy (all isomers), phenyl, phenoxy, benzyl, and benzyloxy. Preferably, the aluminum component is selected from the group consisting of aluminoxanes and tri($C_{1-4}$ hydrocarbyl)aluminum compounds. Most preferred aluminum components are aluminoxanes, trimethylaluminum, triethylaluminum, triisobutylaluminum, and mixtures thereof.

Such treatment typically occurs by:
(a) adding to the calcined silica sufficient solvent to achieve a slurry;
(b) adding to the slurry the agent in an amount of 0.1 to 5 mmol agent per gram of calcined silica, preferably 1 to 2.5 mmol agent per gram of calcined silica to form a treated support;
(c) washing the treated support to remove-unreacted agent to form a washed support, and
(d) drying the washed support by heating and/or by subjecting to reduced pressure.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane is believed to be represented by the following general formulae (—Al(R)—O)$_{m'}$, for a cyclic alumoxane, and $R_2Al—O(—Al(R)—O)_{m'}—AlR_2$, for a linear compound, wherein R is as previously defined, and m' is an integer ranging from 1 to 50, preferably at least 4. Alumoxanes are typically the reaction products of water and an aluminum alkyl, which in addition to an alkyl group may contain halide or alkoxide groups. Reacting several different aluminum alkyl compounds, such as for example trimethyl aluminum and tri-isobutyl aluminum, with water yields so-called modified or mixed alumoxanes. Preferred alumoxanes are methylalumoxane and methylalumoxane modified with minor amounts of $C_{2-4}$ alkyl groups, especially isobutyl. Alumoxanes generally contain minor to substantial amounts of starting aluminum alkyl compound.

Particular techniques for the preparation of alumoxane type compounds by contacting an aluminum alkyl compound with an inorganic salt containing water of crystallization are disclosed in U.S. Pat. No. 4,542,119. In a particular preferred embodiment an aluminum alkyl compound is contacted with a regeneratable water-containing substance such as hydrated alumina, silica or other substance. This is disclosed in EP-A-338,044. Thus the alumoxane may be incorporated into the support by reaction of a hydrated alumina or silica material, which has optionally been functionalized with silane, siloxane, hydrocarbyloxysilane, or chlorosilane groups, with a tri ($C_{1-10}$ alkyl) aluminum compound according to known techniques.

Additionally, alumoxane may be generated in situ by contacting silica or alumina or a moistened silica or alumina with a trialkyl aluminum compound optionally in the presence of an inert diluent. Such a process is well known in the art, having been disclosed in EP-A-250,600; U.S. Pat. No. 4,912,075; and U.S. Pat. No. 5,008,228. Suitable allphatic hydrocarbon diluents include pentane, isopentane, hexane, heptane, octane, isooctane, nonane, isononane, decane, cyclohexane, methylcyclohexane and combinations of two- or more of such diluents. Suitable aromatic hydrocarbon diluents are benzene, toluene, xylene, and other alkyl or halogen substituted aromatic compounds. Most preferably, the diluent is an aromatic hydrocarbon, especially toluene. After preparation in the foregoing manner the residual hydroxyl content thereof is desirably reduced to a level less than 2 mmol of OH per gram of support by any of the previously disclosed techniques.

The support, as calcined and as reacted with a functionalizing agent, is referred to herein as a "support precursor". The support precursor, to which the first solution of either the metal complex or the cocatalyst in a compatible solvent has been applied and from which the compatible solvent is optionally removed, is referred to herein as a "supported procalalyst." The supported procatalyst, to which the second solution of the other of metal complex or the cocatalyst in a compatible solvent has been applied and from which the compatible solvent is optionally removed, is referred to herein as a "supported catalyst." The support precursor, the supported procatalyst, and the supported catalyst will advantageously have a pore volume, as determined by nitrogen adsorption, which is from 0.1 to 3 cm$^3$/g, preferably from 0.2 to 2 cm$^3$1/g.

The process for preparing the supported catalyst system of the invention is advantageous, in that the catalyst and cocatalyst are not mixed prior to depositing them on the support. This accords the catalyst system with improved stability during the preparation process.

The process of the invention is further advantageous in that it minimizes the use of solvent in the deposition step. This minimizes any catalyst deactivation caused by exposure to elevated temperatures and/or vacuum, or by incomplete solvent removal. This also translates to economic advantages attributable to reduced solvent handling.

In one preferred embodiment of the invention, a sequential double impregnation technique in employed. In particular, in this preferred embodiment of the invention, the support precursor is sequentially contacted by a first solution of either the metal complex or the cocatalyst, and thereafter by a second solution of the other of the metal complex or the cocatalyst in each of the two contacting steps, the contacting solution will be provided in an amount such that 100 percent of the pore volume of the support precursor is at no time exceeded. Optionally, the support precursor may be dried to remove compatible solvent after the contacting with the first solution. This feature, however, is not required, provided the solid remains as a dry, free-flowing powder. This embodiment is advantageous, in that batch reactor experiments suggest that it leads to a catalyst exhibiting an improved kinetic profile and a lower exotherm than a catalyst prepared by slurrying the support precursor in a solution of both the metal complex and the cocatalyst.

In another preferred embodiment of the invention, the support precursor is slurried in a first solution of the metal complex or the cocatalyst to form a supported procatalyst. Sufficient compatible solvent is removed from the supported procatalyst to result in a recovered supported procatalyst which is free-flowing, that is, wherein the amount of compatible solvent is less than 100 percent of the pore volume of the support precursor. Thereafter, the recovered supported procatalyst is contacted with a second solution of the other of the metal complex and cocatalyst, whereupon the second solution is provided in an amount less than 100 percent of the pore volume of the support precursor, whereupon a supported catalyst system is formed. As the amount of the second solution is insufficient to render the supported catalyst system not free-flowing, an additional solvent removal step is unnecessary. However, if it is desired, compatible solvent may be more fully removed by application of heat, reduced pressure, or a combination thereof. In a particularly preferred embodiment, the metal complex will be applied in the first solution, and the cocatalyst will be applied in the second solution, particularly when the cocatalyst is easily degraded by the application of heat and/or vacuum during drying.

In the case of each of these preferred embodiments, and particularly in the case of the double impregnation technique, sufficient mixing should be conducted to ensure that the metal complex and cocatalyst are uniformly distributed within the pores of the support precursor, and to ensure that the support precursor remains free-flowing. Some exemplary mixing devices include rotating batch blenders, single-cone blenders, double-cone blenders, and vertical conical dryers.

In the case of each of these preferred embodiments, the applicants have found them to be advantageous in the preparation of preferred catalyst systems wherein the cocatalyst is heat sensitive. Catalyst systems comprising such heat sensitive cocatalysts have been found to degrade upon application of heat over a period of time sufficient to remove the large amounts of compatible solvent normally associated with slurrying techniques.

While not wishing to be bound by theory, the supported catalyst systems of the invention may contain a mixture of a single site constrained geometry or metallocene complex and activator, rather than or in addition to the active species. Once in the reactor at higher temperature and/or in the presence of monomer, additional sites may become active. Thus, catalysts with lower exotherms and increasing rates of polymerization (rising kinetic profile) may be prepared, which may lead to improved performance in the polymerization reactor and improved polymer morphology.

In the formation of the first and second solutions utilized in the process of the invention, exemplary compatible solvents include aliphatic and aromatic hydrocarbons, such as hexane, heptane, ISOPAR™E mixed aliphatic hydrocarbon mixture (available from Exxon Chemical Company), and toluene. Such a compatible solvent will be selected in part on the basis of the solubility of the metal complex or cocatalyst to be dissolved therein, as will be evident to one skilled in the art.

As set forth above, it may be desirable during the process to remove compatible solvent (after the applying of the first solution and/br after the applying of the second solution) to ensure that the amount of solvent present does not exceed the pore volume of the support precursor. As stated above, minimum solvent translates to greater stability during drying, particularly in the case of heat sensitive metal complexes and/or cocatalysts, as well as handling benefits associated with the production of a free-flowing material, as opposed to an agglomerated mass. Such solvent removal will be achieved by applying to the slurry a vacuum of from 0.05 to 150 Torr, preferably from 0.05 to 40 Torr and/or by heating the slurry to a temperature of from 0 to 60° C., preferably from 20 to 40° C., with the understanding that when a vacuum is applied, any temperature of heating may be correspondingly reduced.

Concerning the Presence of Scavengers

The supported catalysts of the invention may also be used in combination with a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 10 carbons in each hydrocarbyl or hydrocarbyloxy group, or a mixture of the foregoing compounds, if desired. These aluminum compounds are usefully employed for their beneficial ability to scavenge impurities such as oxygen, water, and aldehydes from the polymerization mixture. Preferred aluminum compounds include $C_{2-6}$ trialkyl aluminum compounds, especially those wherein the alkyl groups are ethyl, propyl, isopropyl, n-butyl, isobutyl, pentyl, neopentyyl, or-isopentyl, and methylalumoxane modified methylalumoxane and diisobutylalumoxane.

Catalyst:Cocatalyst Ratios

The molar ratio of catalyst/cocatalyst employed ranges from 1; 1000 to 1:10, preferably ranges from 1:10 to 1:1, more preferably from 1:5 to 1:1. Mixtures of catalysts or activating cocatalysts may also be employed if desired.

Concerning Polymerizable Monomers

The catalysts, whether or not supported, in any of the processes of this invention; whether gas phase, solution, slurry, or any other polymerization process, may be used to polymerize addition polymerizable monomers include ethylenically unsaturated monomers, acetylenic compounds, conjugated or nonconjugated dienes, polyenes, and mixtures thereof. Preferred monomers include olefins, for example α-olefins having from 2 to 100,000, preferably from 2 to 30, more preferably from 2 to 8 carbon atoms and combinations of two or more of such α-olefins.

Particularly suitable α-olefins include, for example, ethylene, propylene, 1-butene, 1-pentene, 4-methylpentene- 1,1-hexene, 1-heptene, 1-octene, 1-nonene, 1-decene, 1-undecene, 1-dodecene, 1-tridecene, 1-tetradecene, 1-pentadecene, and $C_{16}$–$C_{30}$ α-olefins or combinations thereof, as well as long chain vinyl terminated oligomeric or polymeric reaction products formed during the polymerization. Preferably, the α-olefins are ethylene, propene, 1-butene, 4-methyl-pentene-1, 1-hexene, 1-octene, and combinations of ethylene and/or propene with one or more of such other α-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the abovementioned monomers may also be employed.

A preferred group of olefin comonomers for polymerizations where ethylene is the monomer includes propene, 1-butene, 1-pentene, 4-methyl-1-pentene, 1-hexene, 1-heptene, 1-octene, 1-nonene, 1-decene, 1,7-octadiene, 1,5-hexadiene, 1,4-pentadiene, 1,9-decadiene, ethylidenenorbornene, styrene, or a mixture thereof. For polymerizations wherein propene is the monomer, the preferred comonomers are the same as that immediately previous, but with the inclusion of ethylene instead of propene.

Concerning the Presence of Long Chain Branching

Long chain macromolecular α-olefin can be vinyl terminated polymeric remnants formed in situ during the practice of the polymerization process of this invention. Under suitable processing conditions such long chain macromolecular units may be polymerized into the polymer product along with ethylene and other short chain olefin monomers to give small quantities of long chain branching in the resulting polymer. In a preferred embodiment of the invention, the resultant polymers will be characterized as being substantially linear polymers, as described and claimed in U.S. Pat. Nos. 5,272,236, 5,278,272, and 5,665,800.

General Polymerization Conditions

In general, the polymerization may be accomplished at conditions well known in the prior art for Ziegler-Natta or Kaminsky-Sinn type polymerization reactions. Suspension, solution, slurry, gas phase or high pressure, whether employed in batch or continuous form or other process conditions, may be employed if desired. Examples of such well known polymerization processes are depicted in WO 88/02009, U.S. Pat. Nos. 5,084,534; 5,405,922; 4,588,790; 5,032,652; 4,543,399; 4,564,647; 4,522.987, and elsewhere. Preferred polymerization temperatures are from 0 to 250° C. Preferred polymerization pressures are from $2\times10^5$ to $1\times10^7$ Pa.

The process of the present invention can be employed to advantage in the gas phase copolymerization of olefins. Gas phase processes for the polymerization of olefins, especially the homopolymerization and copolymerization of ethylene and propylene, and the copolymerization of ethylene with higher α-olefins such as, for example, 1-butene, 1-hexene, 4-methyl-1-pentene are well known in the art. Such processes are used commercially on a large scale for the manufacture of high density polyethylene (HDPE), medium density polyethylene (MDPE), linear low density polyethylene (LLDPE) and polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and a one or more heat exchangers to strip the gas of the heat of polymerization.

A preferred method of cooling of the bed, in addition to the cooling provided by the cooled the recycle gas, is to feed a volatile liquid to the bed to provide an evaporative cooling effect. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can be suitably be fed to the bed to provide an evaporative cooling effect. Examples of olefin monomers which can be employed in this manner are olefins containing 3 to 8, preferably 3 to 6 carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example, in EP 89691; U.S. Pat. No. 4,543,399; WO 94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in BP Chemicals' WO 94/28032.

The polymerization reaction occurring in the gas fluidized bed is catalyzed by the continuous or semi-continuous addition of catalyst. Such catalyst can be supported on an inorganic or organic support material as described above. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed copolymerization of the monomer and one or more comonomers on the fluidized particles of catalyst, supported catalyst or prepolymer within the bed. Start-up of the polymerization reaction is achieved using a bed of preformed polymer particles, which are preferably similar to the target polyolefin, and conditioning the bed by drying with inert gas or nitrogen prior to introducing the catalyst, the monomers and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired.

The gas phase processes suitable for the practice of this invention are preferably continuous processes which provide for the continuous supply of reactants to the reaction zone of the reactor and the removal of products from the reaction zone of the reactor, thereby providing a steady-state environment on the macro scale in the reaction zone of the reactor.

Typically, the fluidized bed of the gas phase process is operated at temperatures greater than 50° C., preferably from 60° C. to 110° C., more preferably from 70° C. to 110° C.

Typically the molar ratio of comonomer to monomer used in the polymerization depends upon the desired density for the composition being produced and is 0.5 or less desirably, when producing materials with a density range of from 0.91 to 0.93 the comonomer to monomer ratio is less than 0.2, preferably less than 0.05, even more preferably less than 0.02, and may even be less than 0.01. Typically, the ratio of hydrogen to monomer is less than 0.5, preferably less than 0.2, more preferably less than 0.05, even more preferably less than 0.02 and may even be less than 0.01.

The above-described ranges of process variables are appropriate for the gas phase process of this invention and may be suitable for other processes adaptable to the practice of this invention.

A number of patents and patent applications describe gas phase processes which are adaptable for use in the process of this invention, particularly, U.S. Pat. Nos. 4,588,790; 4,543,399; 5,352.749; 5,436,304; 5,405,922; 5.462,999; 5,461,123; 5.453,471; 5,032.562; 5,028,670; 5,473,028; 5,106,804; and EP applications 659,773; 692,500; and PCT Applications WO 94/29032, WO 94/25497, WO 94/25495, WO 94/28032; WO 95/13305; WO 94/26793; and WO 95/07942.

Molecular weight control agents can be used in combination with the present cocatalysts. Examples of such molecular weight control agents include hydrogen, trialkyl aluminum compounds or other known chain transfer agents.

EXAMPLES

Unless otherwise stated, all manipulations were carried out in an inert atmosphere either in a nitrogen-filled glove box or under nitrogen using Schlenk techniques.

Reagents, Rac-ethylene-bis(indenyl)Zr(II) 1,4-diphenyl-1,3-butadiene, henceforward called EBIZr(II), and Rac-ethylene bis(tetrahydroindenyl)Zr(II) 1,4-diphenyl-1,3-butadiene, henceforward called EBTHIZr(II) were prepared as described in U.S. Pat. No. 5,527,929, examples 11 and 33, respectively. (t-butylamido)(tetramethyl-$\eta^5$-cyclopentadienyl)dimethylsilanetitanium (II) $\eta^4$-3-methyl-1,3-pentadiene, henceforward called CGCTi(II) was prepared as described in U.S. Pat. No. 5,470,993, example 17. Tris(Pentafluorophenyl)borane was purchased from Boulder Scientific and used without further purification. bis (hydrogenated tallow alkyl)methyl ammonium tris (pentafluorophenyl)(4-hydroxyphenyl)borate, henceforward called HAHB, was prepared as described in PCT98/27119. ISOPAR™E hydrocarbon mixture was obtained from Exxon Chemical Company. All other solvents were purchased from Aldrich Chemical Company as anhydrous reagents and were further purified by a nitrogen purge and by passing them down a 12 inch column of chunk alumina which had been heat treated overnight at 250° C.;

Preparation of TEA-treated ES-70 silica. A 200 g sample of Crosfield ES-70 silica was calcined for 4 hours at 500° C. in air, then transferred to a nitrogen-filled glove box. A 20 g sample of the silica was slurried in 120 mL hexane, and 30.8 mL of a 1.0 M solution of triethylaluminum in hexanes was added over several minutes. The slurry was allowed to stand for 1 hour. At this time, the solids were collected on a fritted funnel, washed three times with hexanes, and dried in vacuo.

Preparation of TEA-treated 948 silica. A 200 sample of Davison 948 silica (available from Grace-Davison) was calcined for 4 hours at 250° C. in air, then transferred to a nitrogen-filled glove box. A 15 g sample of the silica was slurried in 90 mL hexane, and 30 mL of a 1.0 M solution of triethylaluminum in hexane was added over several minutes. The addition rate was slow enough to prevent solvent reflux. The slurry was agitated on a mechanical shaker for 1 hour. At this time, the solids were collected on a fritted funnel, washed three times with 50 mL portions of hexanes, and dried in vacuo.

Preparation of Scavenger. ES-70 silica from Crosfield was calcined in air, in a flat tray, at 200° C. for four hours. The calcined silica was poured into a dry glass bottle and quickly transferred to an inert atmosphere glove box. In the dry box, 30.0 g of the calcined ES-70 were accurately weighed into a 500 mL Schlenk flask, and 150 mL of hexane were added to make a slurry. The flask was fitted with a septum and taken out of the drybox where 0.90 mL of deionized water were added. The flask was shaken vigorously, by hand, for a few moments and then returned to the drybox. Next, 100 mL of 1 M TEA in hexane were added to the flask, by syringe, while swirling the flask by hand. The total addition time was 5 minutes. The flask was agitated vigorously by hand and left to stand for about an hour. The treated silica was filtered on a fritted funnel and washed with several volumes of hexane. The silica was returned to the Schlenk flask and dried to constant weight under vacuum at ambient temperature.

Agitated Dry-Phase Polymerization Reactions. A 2.5-L stirred, fixed bed autoclave was charged with 300 g dry NaCl, and stirring was begun at 300 rpm. The reactor was pressurized to 7 bar ethylene and heated to the polymerization reaction temperature. 1-hexene and hydrogen were introduced to the appropriate ppm concentration, as measured by massed 56 and 2 on a mass spectrometer, respectively. A scavenger, prepared as described above, was introduced to the reactor. In a separate vessel, 0.1 g of the supported catalyst was mixed with an additional 0.5 g of the scavenger. The combined catalyst and scavenger were subsequently injected into the reactor. Ethylene pressure was maintained on a feed as demand, and hexene was fed as a liquid to the reactor to maintain the ppm concentration. Temperature was regulated by dual heating and cooling baths. After 90 minutes the reactor was depressurized, and the salt and polymer were removed via a dump valve. The polymer was washed with copious distilled water to remove the salt, then dried at 50° C.

Example One

Monoimpregnated EBIZr(II)/FAB Catalyst

To 3.0 g of $Et_3Al$ treated ES-70 silica prepared as described above was added 8 mL of toluene and 3.20 mL of a 0.037 M ethylene EBIZr(II) solution in toluene. The mixture was dried under vacuum at ambient temperature until the fluidization of the powder ceased. Two days later, to 1 g of the above powder was added 0.22 mL of a 0.1 M solution of tris(pentafluorophenyl)borane, and the powder was mixed until it was homogenous. The solvent was not dried from the pores of the silica. Five days after the tris(pentafluorophenyl)borane addition, the catalyst was tested for olefin polymerization activity as described above with a hexene concentration of 3000 ppm, no added hydrogen, and a polymerization temperature of 70° C. Addition of 0.1 g catalyst resulted in a 16° C. exotherm and a gently decaying kinetic profile with a net efficiency of 40 g/gHrBar over 90 minutes.

Example Two

Double Impregnated CGCTI/(II)/HAHB Catalyst

To 2.5 mL of a 0.04 M solution of HAHB in toluene was added 60 μL of a 1.9 M $Et_3Al$ solution. The solution was next added to 2.5 g of $Et_3Al$-treated Davison 948 silica prepared as described above. The mixture was vigorously agitated to a free flowing powder, then the solvent was removed under vacuum. Next, 0.5 mL of a 0.2 M solution of CGCTi(II) in Isopar®E was added to the dry supported cocatalyst. The mixture was again agitated, then the solvent was removed in vacuo yielding a brown-green solid. A 0.1 g sample of the catalyst was evaluated for polymerization activity as described above with a hexene concentration of 3000 ppm and a hydrogen concentration of 800 ppm. Injection of the catalyst resulted in a 5.5° C. exotherm. After the initial exotherm it had a moderately decaying kinetic profile. The net activity was 99 g/gHrBar for a 90 minute run.

Example Three

Comparative Example of a Slurried and Dried CGCTi(II)/HAHB Catalyst

To 3 mL of a 0.040 M solution of HAHB in toluene was added 70 μL of a 1.9 M $Et_3Al$ solution in toluene. This solution was mixed for 30 seconds, then was added to 3.0 g $Et_3Al$-treated Davison 948 silica prepared as described above in 12 mL toluene. To this slurry was added 0.55 mL of a 0.22 M solution of CGCTi(II) in toluene. The combined mixture was slurried briefly (<1 minute), and the solvent was removed under vacuum to give a free flowing, green/brown solid. A 0.1 g sample of the catalyst was evaluated for polymerization activity under identical conditions as described above in example 2. Catalyst injection resulted in a 30° C. exotherm. After the initial exotherm it had steeply decaying kinetic profile. The net activity was 53 g/gHrBar for a 90 minute run.

Example Four

Double Impregnated EBIZr(II)/HAHB Catalyst

In an inert atmosphere dry box, 2.0 g of Crosfield ES-70 silica prepared as described above was accurately weighed into a 100 mL schlenk flask. In a separate container, 1.2 mL of 0.081 M HAHB in toluene and 60 μL of 1.76 M TEA were together for one minute. The solution was quantitatively transferred to the silica via syringe, and the silica was agitated to a uniform and free flowing powder. The solvent was removed under vacuum at ambient temperature until the point of constant weight. Next, 2.5 mL of 0.026 M EBIZr(II) solution in toluene were added, and the mixture was vigorously agitated until the powder was uniform and free flowing. The solvent was removed under vacuum at ambient temperature until the point of constant weight. 2.0 g of red catalyst powder were recovered. A gas phase batch polymerization reaction was carried out at 70° C. as described above with a hexene concentration of 8000 ppm and no added hydrogen. Injection of 0.1 g of the catalyst resulted in a 7.9° C. exotherm. After the initial exotherm, the reaction proceeded with a stable kinetic profile. The net activity was 63 g/gHrBar for a 90 minute run.

Example Five

Double Impregnated EBTHIZr(II)/HAHB Catalyst

In an inert atmosphere glove box, 2.0 g of Crosfield ES-70 silica prepared as described above were accurately weighed into a 100 mL schlenk flask. In a separate flash, 0.78 mL of a 0.081 M solution of HAHB in toluene and 40 μL of 1.76 M TEA in toluene were combined. The solution was quantitatively transferred to the silica using a syringe, and the silica was agitated until to a uniform and free flowing powder. The solvent was removed under vacuum at ambient temperature until the point of constant weight. Next, 25 ml of a 0.017 M solution of EBTHIZr(II) in toluene was added, and the mixture was vigorously agitated to a uniform, free flowing powder. The solvent was removed under vacuum at ambient temperature until the point of constant weight. A gas phase batch polymerization reaction was carried out at 70° C. as described above with a hexene concentration of 8000 ppm and 850 ppm hydrogen. Injection of 0.05 g of the catalyst resulted in a 5° C. exotherm. After the initial exotherm, the reaction proceeded with a stable kinetic profile. The net activity was 130 g/gHrBar for a 90 minute run.

What is claimed is:

1. A process for preparing an olefin polymerization catalyst comprising the steps of:
   A. calcining silica at a temperature of 30 to 1000° C. to form calcined silica,
   B. reacting the calcined silica with an agent selected from the group consisting of:
      i. Lewis acid alkylating agents,
      ii. silane or chlorosilane functionalizing agents, and
      iii. aluminum components selected from an alumoxane or an aluminum compound of the formula $AlR^1_{x'}R^2_{y'}$, wherein $R^1$ independently each occurrence is hydride or R, $R^2$ is hydride, R or OR, wherein R is a $C_1$ to $C_{10}$ hydrocarbyl group, x' is 2 or 3, y' is 0 or 1 and the sum of x' and y' is 3,
      to form a support precursor having a specified pore volume,
   C. applying to the support precursor a first solution in a compatible solvent of one of the following:
      (1) a complex of a metal of Group 3, 4, or the Lanthanide metals of the Periodic Table of the Elements or
      (2) a cocatalyst selected from the group consisting of non-polymeric, non-oligomeric complexes capable of activating the complex of (C)(1) for the polymerization of α-olefins
      and removing the compatible solvent of the first solution to form a supported procatalyst;
   D. applying to the supported procatalyst a second solution in a compatible solvent of the other of the complex or the cocatalyst of (C) to form a supported catalyst, wherein the second solution is provided in an amount such that 100 percent of the pore volume of the support precursor is not exceeded; and
   E. removing the compatible solvent of the second solution from the supported catalyst to form a recovered supported olefin polymerization catalyst.

2. The process of claim 1, wherein the first solution of (C) is provided in an amount not in excess of 100 percent of the pore volume of the support precursor, and wherein the compatible solvent of step (C) is removed from the supported procatalyst by heating, subjecting to reduced pressure, or a combination thereof.

3. The process of claim 1, wherein step (C) further comprises:

(i) forming a slurry of the support precursor in the compatible solvent, (ii) adding to the slurry, the complex of step (C)(1) or the cocatalyst of step (C)(2) to form a procatalyst slurry, and (iii) removing the compatible solvent from the procatalsyt slurry to form the supported procatalyst.

4. The process of claim 1, wherein the complex is $L_lMX_mX'_nX''_p$, or a dimer thereof wherein:

L is an anionic, delocalized, π-bonded group that is bound to M, containing up to 50 non-hydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M.

5. The process of claim 4, wherein the complex contains two L groups which are linked by a bridging group, wherein the bridging group corresponds to the formula $(ER^*_2)_x$, wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8.

6. The process of claim 4, wherein the complex corresponds to the formula:

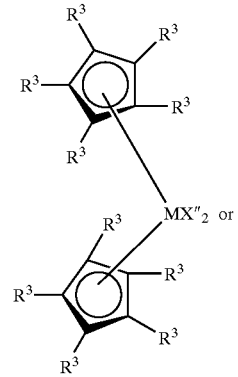

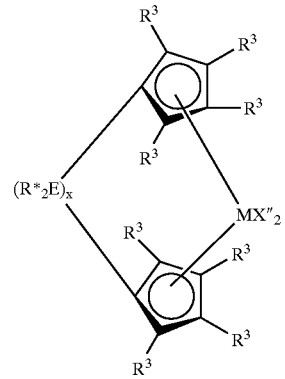

wherein:

M is titanium, zirconium or hafnium, in the +2 or +4 formal oxidation state;

$R^3$ in each occurrence independently is selected from the group consisting of hydrogen, hydrocarbyl, silyl, germyl, cyano, halo and combinations thereof, or adjacent $R^3$ groups together form a hydrocarbadiyl, siladiyl or germadiyl group thereby forming a fused ring system, X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8.

7. The process of claim 1, wherein the complex corresponds to the formula:

$L_lMX_mX'_nX''_p$, or a dimer thereof wherein:

L is an anionic, delocalized, n-bonded group that is bound to M, containing up to 50 non-hydrogen atoms;

M is a metal of Group 4 of the Periodic Table of the Elements in the +2, +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M or a neutral $C_{5-30}$ conjugated diene, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

8. The process of claim 7, wherein the complex corresponds to the formula:

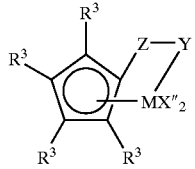

wherein:

M is titanium or zirconium in the +2 or +4 formal oxidation state;

$R^3$ in each occurrence independently is selected from the group consisting of hydrogen, hydrocarbyl, silyl, germyl, cyano, halo and combinations thereof, or adjacent $R^3$ groups together form a hydrocarbadiyl, siladiyl or germadiyl group thereby forming a fused ring system, each X" is a halo, hydrocarbyl, hydrocarbyloxy or silyl group, said group having up to 20 non-hydrogen atoms, or two X" groups together form a $C_{5-30}$ conjugated diene;

Y is —O—, —S—, —NR*—, —PR*—; and

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein: R* independently each occurrence is hydrogen or a group selected from silyl, hydrocarbyl, hydrocarbyloxy and combinations thereof, said R* having up to 30 carbon or silicon atoms.

9. The process of claim 1, wherein the cocatalyst is represented by the formula $(L^*—H)_d^+(A^{d-})$ wherein:

L* is a neutral Lewis base;

$(L^*—H)^+$ is a Bronsted acid;

$A^{d-}$ is a noncoordinating, compatible anion having a charge of d−, and d is an integer from 1 to 3.

10. The process of claim 1, wherein the cocatalyst is represented by the formula $(L^*—H)^+(BQ_4)^-$ wherein:

L* is a neutral Lewis base;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbly-group of up to 20 nonhydrogen atoms, with the proviso that in not more than one occasion is Q hydrocarbyl.

11. The process of claim 1, wherein the cocatalyst comprises a salt of a cationic oxidizing agent and a noncoordinating, compatible anion represented by the formula $(OX^{e+})_d(A^{'d-})_e$ wherein $Ox^{e+}$ is a cationic oxidizing agent having a charge of e+;

e is an integer from 1 to 3;

$A^{'d}$ is a noncoordinating, compatible anion having a charge of d−; and d is an integer from 1 to 3.

12. The process of claim 1, wherein the cocatalyst comprises a salt of a carbenium ion and a noncoordinating, compatible anion represented by the formula $©^+A^{'-}$ wherein:

$©^+$ is a $C_{1-20}$ carbenium ion; and $A^{'-}$ is a noncoordinating, compatible anion having a charge of −1.

13. The process of claim 1, wherein the cocatlyst comprises a compound which is a salt of a silylium ion and a noncoordinating, compatible anion represented by the formula $R_3Si(X')A^{'-}$ wherein:

R is $C_{1-10}$ hydrocarbyl;

X is hydrogen or R; and $A^{'-}$ is a noncoordinating, compatible anion having a charge of −1.

14. The process of claim 1, wherein the support precursor has a pore volume, as determined by nitrogen adsorption, of from 0.1 to 3 cm$^3$/g.

15. The process of claim 1, wherein the reacting of the calcined silica with the agent comprises:

(a) adding to the calcined silica sufficient solvent to achieve a slurry;

(b) adding to the slurry the agent in an amount of 0.1 to 5 mmol agent per gram of calcined silica, to form a treated support;

(c) washing the treated support to remove unreacted agent to form a washed support; and (d) drying the washed support by heating and/or by subjecting to reduced pressure.

16. The process of claim 1, wherein the support precursor has a residual hydroxyl content of less than 2 mmol of OH per gram of support precursor.

17. The process of claim 1, wherein at least one of the supported procatalyst or the supported catalyst is treated by at least one of the following:

a. applying thereto a vacuum of from 0.05 to 150 Torr; or b. heating to a temperature of up to 60° C.

18. A process for polymerizing at least one α-olefin monomer comprising:

A. preparing a supported catalyst by:
  i. calcining silica at a temperature of 30 to 1000° C. to form calcined silica,
  ii reacting the calcined silica with an agent selected from the group consisting of:
    (a) Lewis acid alkylating agents,
    (b) silane or chlorosilane functionalizing agents, and
    (c) aluminum components selected from an alumoxane or an aluminum compound of the formula $AlR^1_{x'}R^2_{y'}$, wherein $R^1$ independently each occurrence is hydride or R, $R^2$ is hydride, R or OR, wherein R is a $C_1$ to $C_{10}$ hydrocarbyl group, x' is 2 or 3, y' is 0 or 1 and the sum of x' and y' is 3,
  to form a support precursor having a specified pore volume,
  iii. applying to the support precursor a first solution in a compatible solvent of one of the following:
    (a) a complex of a metal of Group 3, 4, or the Lanthanide metals of the Periodic Table of the Elements or
    (b) a cocatalyst selected from the group consisting of non-polymeric, non-oligomeric complexes capable of activating the complex of (iii)(a) for the polymerization of α-olefins and removing the compatible solvent of the first solution to form a supported procatalyst;
  iv. applying to the recovered supported procatalyst a second solution in a compatible solvent of the other of the complex or cocatalyst of (iii) to form a supported catalyst, wherein the second solution is provided in an amount such that 100 percent of the pore volume of the support precursor is not exceeded; and
  v. removing the compatible solvent of the second solution from the supported catalyst to form a recovered supported catalyst;
B. pressurizing a gas phase polymerization reactor with the at least one α-olefin monomer to be polymerized;
C. introducing the recovered supported catalyst to the gas phase polymerization reactor;
D. activating the recovered supported catalyst; and
E. recovering polymerized product from the reactor.

19. The process of claim 18, further comprising providing to the reactor a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 10 carbons in each hydrocarbyl or hydrocarbyloxy group, or a mixture of the foregoing compounds, wherein such providing occurs either prior to, during, or subsequent to the introduction to the reactor of the recovered supported catalyst.

* * * * *